July 14, 1964

L. H. WEINBERG 3,141,092

SELECTOR FOR FAST AND INTERMEDIATE ENERGY NEUTRONS POSITIONED
WITHIN MODERATOR AND ABSORBER SHIELDS

Filed June 9, 1961

INVENTOR.
LEO H. WEINBERG
BY

ATTORNEY

United States Patent Office 3,141,092
Patented July 14, 1964

3,141,092
SELECTOR FOR FAST AND INTERMEDIATE ENERGY NEUTRONS POSITIONED WITHIN MODERATOR AND ABSORBER SHIELDS
Leo H. Weinberg, Schenectady, N.Y., assignor to the United States of America as represented by the United States Atomic Energy Commission
Filed June 9, 1961, Ser. No. 120,119
5 Claims. (Cl. 250—108)

The present invention relates to an improved fast and intermediate energy neutron dosimeter.

The increased presence of nuclear machines that subject the individual to gamma radiation and neutrons has made it important to study the biological effects of various radiations and to monitor the amount of radiation exposure received. The term "dose" is generally used to represent the quantity of radiation absorbed by the tissue. The measurement of radiation dosage is contrasted to flux measurement by the fact that the radiation level at any instant is obtained in the latter case and the effect of the amount of radiation received is determined by the former measurement. Radiation measuring instruments used to measure flux or density of various energies are not generally suited for use as dosimeters.

The measurement of the maximum permissible radiation limits for the human being is particularly important for high energy neutron producing devices and the instruments must be capable of furnishing an accurate measurement of the effect due to each of the energy ranges in the neutron energy spectrum. The chief problem is to adapt the neutron dosimeter to respond to the neutron energies that create the largest amount of radiation dosage, while accurately responding to neutron energies of other levels to measure the appropriate neutron dosage. The high energy neutrons produce a greater dosage in the human tissues than the lower energy neutrons. For this reason, the neutron dosimeters have to be designed with a compensating factor to reproduce the response that occurs in the human tissue.

Tissue-equivalent ionization chambers have been designed which have an outer shell of a plastic type material having essentially the same response to a particular type of radiation. These devices measure dose by "weighting" neutron-caused pulses of ionization according to their size. Therefore, in discriminating against gamma-caused pulses by eliminating all pulses smaller than a given size, one also eliminates neutron-caused pulses below a certain average cut-off energy (usually about 0.5 mev.) Another disadvantage in the use of the tissue-equivalent ionization chamber has been the low sensitivity inherent in ionization type instruments. In addition, the range of neutron energies that can be monitored is generally more restricted to the fast neutron energies and does not include appreciable neutron energies in the intermediate range. The tissure equivalent material associated with the ionization chambers also makes the instrument particularly fragile and unsuited for applications where a rugged and more reliable construction is dictated. Other fast neutron dosimeters have been adapted by using a fast neutron detector and including a composition of external material and an internal gas to approximately duplicate the response to neutron energy. These instruments are constructed with some need for precise alignment and selection of the amount of materials and have not been readily adaptable to use with neutron detection instruments already in the laboratory.

The present invention has for its principal object the construction of a neutron dosimeter which has a detection response that varies with neutron energy and, in particular, varies in such a manner as to be proportional to the variation of neutron-dose rate with neutron energy.

A further object of the present invention is to provide a neutron dosimeter which responds to a wide range of neutron energies and is capable of high sensitivity, in the neighborhood of 130 counts per minute for 1 mrem. per hour.

Another object of the present invention is to provide a neutron dosimeter in which all neutrons that are counted yield essentially identical large pulses so that discrimination against the smaller gamma-caused pulses is easier and does not affect any particular neutron energy.

A still further object of the present invention is to provide a neutron dosimeter of simple construction that is both rugged and ably suited for use with neutron detection instruments presently available in the laboratory.

The present invention is composed of a number of constituent parts which have been carefully correlated in a manner to accomplish the above-mentioned objectives. A neutron dosimeter of the present invention has a sensitivity which increases with neutron energy and the compensating shield associated with the neutron detecting means provides the appropriate variation in sensitivity. A conventional thermal neutron detector, such as a $BF_3$ counter, may be used as the basic component of the dosimeter and the detecting means is associated with the compensating shield in such a manner that the desired sensitivity is achieved. One of the key features in the present neutron dosimeter is the positioning of the detecting means inside the compensating shield which is composed of a neutron slowing material and a neutron absorbing material. The fast and intermediate energy neutrons pass into the compensating shield and are converted to thermal neutrons, such that the probability of detection of thermal neutrons produced by the higher energy incident neutrons is increased in proportion to the neutron energy dosage response of the human tissue. The neutron absorbing material is located between the detecting means and the neutron source within the neutron slowing material so that the desired compensating response for the thermal neutron detecting means is obtained.

Figure 1:
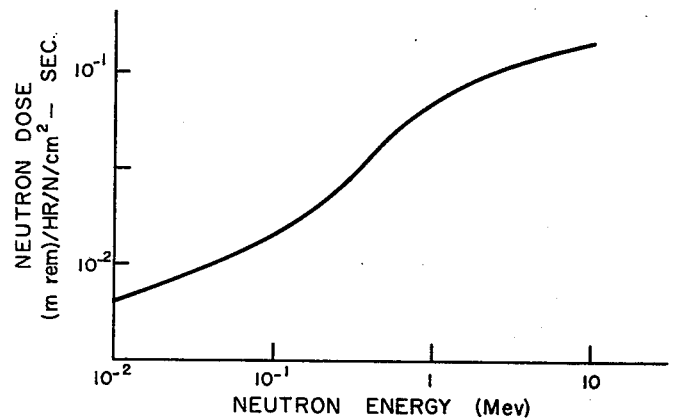
FIG. 1 is a graph showing the biological dosage for various neutron energies.

Referring to FIG. 1, which shows the neutron dose received in the human tissue at various neutron energies, it can be seen that a neutron detector that responds equally well to all neutron energies is not satisfactory as a neutron dosimeter. Neutrons in the energy range between 10,000 ev. and 100,000 ev. produce considerable less energy transfer in the human tissue than neutrons in the 1 to 10 mev. range. A detector that is built such that the probability of detection of a neutron would depend on its energy in a manner similar to the curve in FIG. 1 would produce a counting rate proportional to the neutron dose. A mathematical expression of the relationship can be established by letting $D(E)$ be the biological dose due to a neutron of energy E, and let $N(E)dE$ be the number of neutrons between energy E and $E+dE$. Then the total dose, $D_t$ is $$D_t = \int_0^\infty D(E)N(E)dE$$

Now let $P(E)$ be the probability of a neutron of energy E being detected in the counter. Then the total count, $C_t$ is $$C_t = \int_0^\infty P(E)N(E)dE$$

The total count will be proportional to the total dose if $P(E)$ is proportional to $D(E)$ for all E. The detector described herein is designed with this objective.

Figure 2:
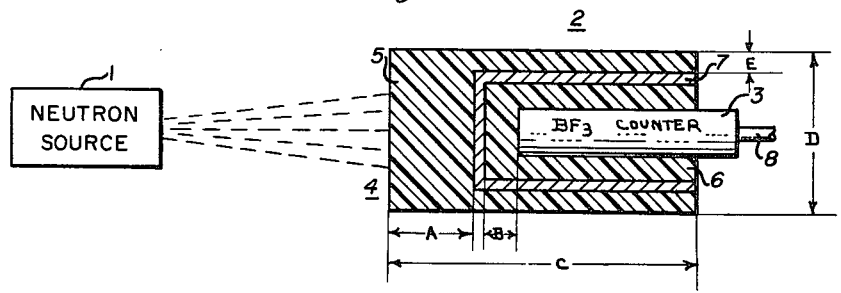
FIG. 2 is a partial section view in elevation through a neutron detecting means constructed in accordance with the present invention.

The apparatus shown in FIG. 2 is a neutron dosimeter designed according to the present invention. A source 1 delivers a beam of fast and intermediate energy neutrons in an area that will be frequented by human beings. It is necessary to monitor the amount of radiation dosage received from the source to determine the extent of time that the individuals can remain in the area and to continuously observe changes in the radiation dosage. The neutron dosimeter 2 comprises a thermal neutron detector such as a $BF_3$ counter 3 and a compensating shield 4. The compensating shield 4 includes two regions 5 and 6 of neutron slowing material, such as paraffin, polyethylene, water, or any hydrogenous material, and a layer 7 of neutron absorbing material, such as cadmium. The counts produced in the thermal neutron detector 3 are analyzed in appropriate electric apparatus well known in the radiation instrument art and the dosimeter output signal is taken from the counter by means of electrical connections through cable 8.

As shown in FIG. 2, the neutron detecting means 3 is disposed at a substantial distance from the external face of the compensating shield 4. Fast neutrons at the higher energies pass into the compensating shield to a substantial distance before they are thermalized and detected. These fast neutrons readily pass through neutron slowing region 5, thermal neutron absorption layer 7 and into region 6. In this manner the compensating field is made more sensitive to the higher energy neutron. The neutrons in the intermediate energy range and the low energy fast neutrons do not pass as far into the compensating shield before being thermalized. Some of the lower energy neutrons are thermalized in region 5 and are absorbed in the intervening layer 7. In this manner, the compensating shield is less sensitive to neutrons of lower energies and the number of thermal neutrons reaching detection means 3 due to the lower energy incident neutrons from the source is less than in the absence of the absorption layer 7. In other words, the relative sensitivity of the array to low energy neutrons is reduced. The compensating shield 4 increases the relative sensitivity of the array to higher energy neutrons by making the neutrons penetrate a given distance into the compensating shield 4 before they can reach the detecting means 3. In addition, since the neutrons also migrate or diffuse after reaching thermal energy, the use of a strong thermal neutron absorber 7 at a position of shallow penetration serves to reduce the chances of low energy neutrons, which on the average become thermal in the region of shallow penetration, from reaching the detector. These two effects serve to make the sensitivity of the array vary with the energy closely proportional to the variation of neutron dose-rate with energy.

The disclosed invention, as shown in FIG. 2, has been subjected to neutrons in the energy range from 200,000 ev. to 14 mev., using the Van de Graaff generator and standard neutron sources, and the .02 mev. data was calculated with the aid of data attained at higher energies. The results produced a curve showing the variation of counting rate per unit of dose rate as a function of neutron energy that was reasonably flat and by using a conversion of about 130 counts per minute equal to 1 mrem. per hour the dose could reasonably be measured within + or −20% of the correct dose.

There is no exact mathematical relationship that determines the optimum placement of the detecting means 3 and of the absorbing material 7. Multi-energy group calculations and the operating tests indicate that suitable dimensions are as follows, referring to FIG. 2, $A=1.58''$; $B=1.18''$; $C=8.73''$; $D=6.75''$ and $E=.78''$. The absorbing material used was cadmium sheet .020" thick. This exact thickness is not critical but it should be thick enough to absorb all of the thermal neutrons that enter it but at the same time should be thin so as not to have any appreciable effect on higher energy neutrons. Any thickness between .015" and .040" would be satisfactory.

Polyethylene was used as the neutron slowing material. The energy dependence of the dosimeter could be further improved to more closely approach the neutron dose-rate energy dependence if the detectors and the neutron absorbing material were placed further from the face of the compensating shield. Doing this, however, would increase the size and weight of the dosimeter and reduce its overall sensitivity. Therefore, the optimum dimensions depend on how the dosimeter is to be used, and a balance must be made with accuracy against size, weight and efficiency. The disclosed dimensions for the dosimeter are satisfactory where the dosimeter is used to survey the neutron dosage outside reactor power plant shields. It does not appear from the test that any substantial reduction in the dimensions of the dosimeter tested are feasible without a substantial loss of accuracy.

The disclosed dosimeter provides a rugged and simplified construction that has good gamma discrimination, a wide range of neutron energy coverage, and adequate sensitivity. A number of changes and variations embodied can be made in the disclosed invention without departing from the inventive aspects which are more fully defined in the appended claims.

I claim:

1. Apparatus for measuring biological dosage from a source of fast and intermediate neutrons comprising means for detecting neutrons substantially only in the thermal energy range, said detecting means being positioned with one end for receiving said neutrons from said source, compensating shield means including both a neutron absorbing and slowing material positioned between said source and said end and substantially enclosing and contiguous with said end, said slowing material having one layer positioned between said end and said absorbing material and having another layer positioned between said absorbing layer and said source, the relative thickness of said layers being such that low energy neutrons from the source are absorbed while high energy neutrons are slowed as they pass through the shield and the detector measures a quantity dependent upon the energy level of the neutrons in proportion to the dosage received.

2. The apparatus according to claim 1 wherein the neutron absorbing layer is made of cadmium and is between .015 and .040 inch thick, the cadmium layer being located approximately 1.58 inches within the neutron slowing material and approximately 1.18 inches from the detecting means, said neutron slowing material is polyethylene, and said detecting means is a $BF_3$ neutron counter.

3. Apparatus for measuring the biological dosage due to fast and intermediate energy neutrons with a thermal neutron detector comprising a relatively thick layer of neutron moderating material interposed directly between the source of neutrons and one end of the detector and contiguous with and enclosing said one end of said detector for increasing the detector sensitivity for high energy neutrons, a relatively thin neutron absorbing layer at a distance within said neutron moderating means between said detector and the side of the neutron moderator exposed to the fast and intermediate energy neutrons for decreasing the detector sensitivity for neutrons in the low energy range, said thin absorbing layer also enclosing the end of said detector whereby said neutrons in order to reach the detector must pass through a moderating layer, an absorbing layer and another moderating layer in sequence.

4. In apparatus for measuring neutron flux with a thermal neutron detector in which the dosage value resulting from said flux increases with increasing energy of said neutrons, the improvement comprising a compensating shield enclosing one end of said detector directly between the source of said neutron flux and said end for thermalizing all of said neutrons for absorbing a large proportion of the neutrons having low energy and for providing a response at said detector which increases substantially as the value of said dosage increases for high and intermediate energy fast neutrons, said compensating shield including a first substantially thick cup-shaped moderator substantially enclosing said detector end, a relatively thin cup-shaped neutron absorber substantially enclosing said first cup-shaped moderator, and a relatively thick second cup-shaped moderator substantially enclosing said absorber whereby as the energy of the neutrons increases, the probability increases that they will pass through both the second moderator and the absorber to be thermalized within the first moderator close to the detector while low-energy neutrons are thermalized in the second cup-shaped member and absorbed.

5. A fast neutron dosimeter for providing a count rate varying directly as a function of the neutron energy irradiated from a source comprising an elongated thermal neutron detector, a compensating shield completely enclosing one end and the sides of said detector and interposed for a substantial distance directly between the source and said end of the detector, said shield including a first moderator having regions contiguous with the said end and sides of said detector in which the region adjacent the end is thicker than the region adjacent the sides, a relatively thin neutron absorber contiguous with and substantially completely surrounding the exterior surface of said first moderator, a second moderator having regions contiguous with and substantially completely enclosing said neutron absorber in which the region directly in front of said end of the detector is larger than the region surrounding the sides of said detector and has a sufficient thickness to thermalize low energy neutrons whereby neutrons from the source must travel a substantial distance through moderating material to reach the end of said detector such that the probability of detection of neutrons increases directly in relation to their energy level except for low energy neutrons which are absorbed.

References Cited in the file of this patent
UNITED STATES PATENTS

| | | |
|---|---|---|
| 2,556,768 | McKibben | June 12, 1951 |
| 2,719,823 | Zinn | Oct. 4, 1955 |
| 2,761,071 | Hurst | Aug. 28, 1956 |
| 2,862,106 | Scherbatskoy | Nov. 25, 1958 |
| 3,089,958 | Janner | May 14, 1963 |